(12) United States Patent
Swanson et al.

(10) Patent No.: US 9,506,302 B2
(45) Date of Patent: Nov. 29, 2016

(54) SYSTEM FOR ATTACHING A GULLWING TO A CATWALK

(71) Applicant: Forum US, Inc., Houston, TX (US)

(72) Inventors: Gregory David Swanson, Magnolia, TX (US); Alexandro Roman Ramirez, Houston, TX (US)

(73) Assignee: FORUM US, INC., Houston, TX (US)

( * ) Notice: Subject to any disclaimer, the term of this patent is extended or adjusted under 35 U.S.C. 154(b) by 318 days.

(21) Appl. No.: 14/207,092

(22) Filed: Mar. 12, 2014

(65) Prior Publication Data

US 2014/0271045 A1 Sep. 18, 2014

Related U.S. Application Data

(60) Provisional application No. 61/780,588, filed on Mar. 13, 2013.

(51) Int. Cl.
*E21B 19/00* (2006.01)
*E21B 19/15* (2006.01)

(52) U.S. Cl.
CPC .......... *E21B 19/15* (2013.01); *Y10T 29/49947* (2015.01); *Y10T 403/32* (2015.01)

(58) Field of Classification Search
CPC ...... E21B 19/14; E21B 19/15; E21B 19/155; B65G 1/0442; B65G 2201/0217; B65G 2201/0276; Y10T 403/32; Y10T 29/49947; Y10T 403/7015; B65D 85/20
USPC ............ 414/22.51–22.71; 211/70.4; 403/116
See application file for complete search history.

(56) References Cited

U.S. PATENT DOCUMENTS

| 2,958,430 | A | * | 11/1960 | Robishaw | E21B 19/155 |
| | | | | | 414/22.52 |
| 3,254,776 | A | * | 6/1966 | Brown | B65G 1/08 |
| | | | | | 193/17 |
| 4,051,956 | A | * | 10/1977 | Teague | E21B 19/15 |
| | | | | | 414/22.62 |
| 4,441,655 | A | | 4/1984 | Blumhardt | |
| 4,798,511 | A | | 1/1989 | Kaczmarczyk et al. | |
| 8,016,536 | B2 | | 9/2011 | Gerber et al. | |
| 8,033,779 | B2 | | 10/2011 | Gerber et al. | |
| 8,690,517 | B1 | * | 4/2014 | Perrault | B29C 66/65 |
| | | | | | 414/22.62 |
| 2007/0031215 | A1 | * | 2/2007 | Belik | E21B 19/155 |
| | | | | | 414/22.62 |
| 2008/0263990 | A1 | * | 10/2008 | Morelli | E21B 19/14 |
| | | | | | 52/650.3 |
| 2009/0056932 | A1 | * | 3/2009 | Lesko | E21B 19/15 |
| | | | | | 166/77.52 |
| 2009/0196711 | A1 | * | 8/2009 | Gerber | E21B 19/15 |
| | | | | | 414/22.58 |
| 2010/0068006 | A1 | * | 3/2010 | Littlewood | E21B 19/15 |
| | | | | | 414/22.61 |
| 2011/0044787 | A1 | * | 2/2011 | Fikowski | E21B 19/155 |
| | | | | | 414/22.59 |
| 2014/0093304 | A1 | | 4/2014 | Muraoka et al. | |

FOREIGN PATENT DOCUMENTS

WO 2013173459 11/2013

OTHER PUBLICATIONS

PCT Search Report and Written Opinion for International Application No. PCT/US14/25725 dated Aug. 15, 2014.

* cited by examiner

*Primary Examiner* — Michael McCullough
*Assistant Examiner* — Lynn Scwenning
(74) *Attorney, Agent, or Firm* — Patterson & Sheridan, L.L.P.

(57) ABSTRACT

A system for connecting a gullwing to a catwalk comprising a gullwing pin movable in an indexer groove that enables a foot pad of the gullwing to remain stationary relative to the catwalk when the gullwing is raised or lowered.

7 Claims, 8 Drawing Sheets

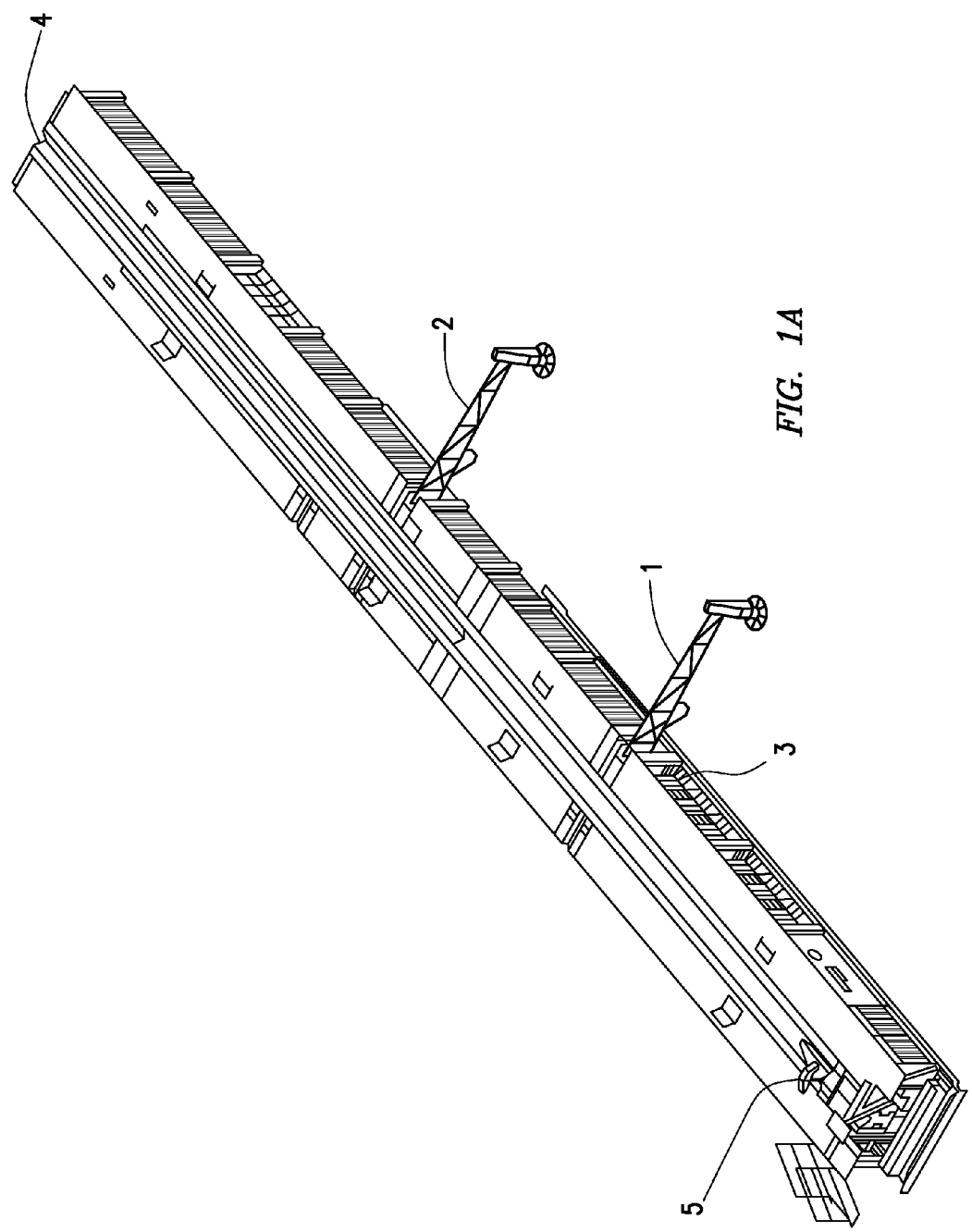

SYSTEM FOR ATTACHING A GULLWING TO A CATWALK

CROSS REFERENCE TO RELATED APPLICATIONS

This application claims benefit of U.S. Provisional Patent Application No. 61/780,588, filed Mar. 13, 2013, the contents of which are herein incorporated by reference in their entirety.

BACKGROUND OF THE INVENTION

1. Field of the Invention

Embodiments of the invention generally relate to catwalks for conveying pipe to a drill floor from a lower section of a drilling rig or drill site. Specifically, embodiments of the invention relate to an apparatus for attaching a "gullwing" to the catwalk so that the gullwing pad will not move toward and away from the catwalk as the gullwing is raised and lowered during the conveying of pipe to the catwalk trough.

2. Description of the Related Art

In a drilling operation or rig work-over operation, whether on a water-based or land-based drilling rig, pipe for the drilling operation, casing, or other tubulars are often stored at or supplied from a level that is lower than the drill floor. Operators typically use a "catwalk" to convey the pipe from the lower level to the drill floor. The pipe is typically mechanically transported (e.g. pushed and/or pulled) in a v-shaped trough, from a level below the rig floor to the rig floor.

Before they are positioned in the catwalk trough and transported to the drill floor, multiple sections of pipe or other tubulars can be positioned on multiple "gullwings" positioned adjacent to the catwalk. The ends of the gullwings positioned away from the catwalk are hydraulically raised to create a slope in the direction of the catwalk and trough. Prior art components known as indexers cause a single section of pipe to roll to the trough.

One problem with existing gullwings is that the pads for the gullwing feet will shift away from the catwalk when the gullwing is raised, and will shift toward the catwalk when the gullwing is lowered. This creates a potentially dangerous situation in that the sliding pads could potentially injure workers working nearby, wear down the ground below the gullwing (thus causing the pipe to be stored in an uneven position), or wear out the feet pads. Accordingly, it would be useful to have a system for connecting the gullwing to the catwalk which would minimize the movement of the gullwing pads when the gullwing is raised and lowered.

SUMMARY OF THE INVENTION

Embodiments of the invention provide a system for connecting a gullwing to a catwalk in which a gullwing pin is allowed to move in relation to the connection point in the catwalk instead of causing a gullwing foot pad to move relative to the ground. The system also allows for the quick removal of the gullwing from the catwalk by lifting the gullwing vertical relative to the catwalk.

BRIEF DESCRIPTION OF THE DRAWINGS

So that the manner in which the above recited aspects of the invention can be understood in detail, a more particular description of embodiments of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A shows a catwalk in the position in which pipe is loaded onto the catwalk or unloaded from the catwalk.

DETAILED DESCRIPTION

Figure 1B:
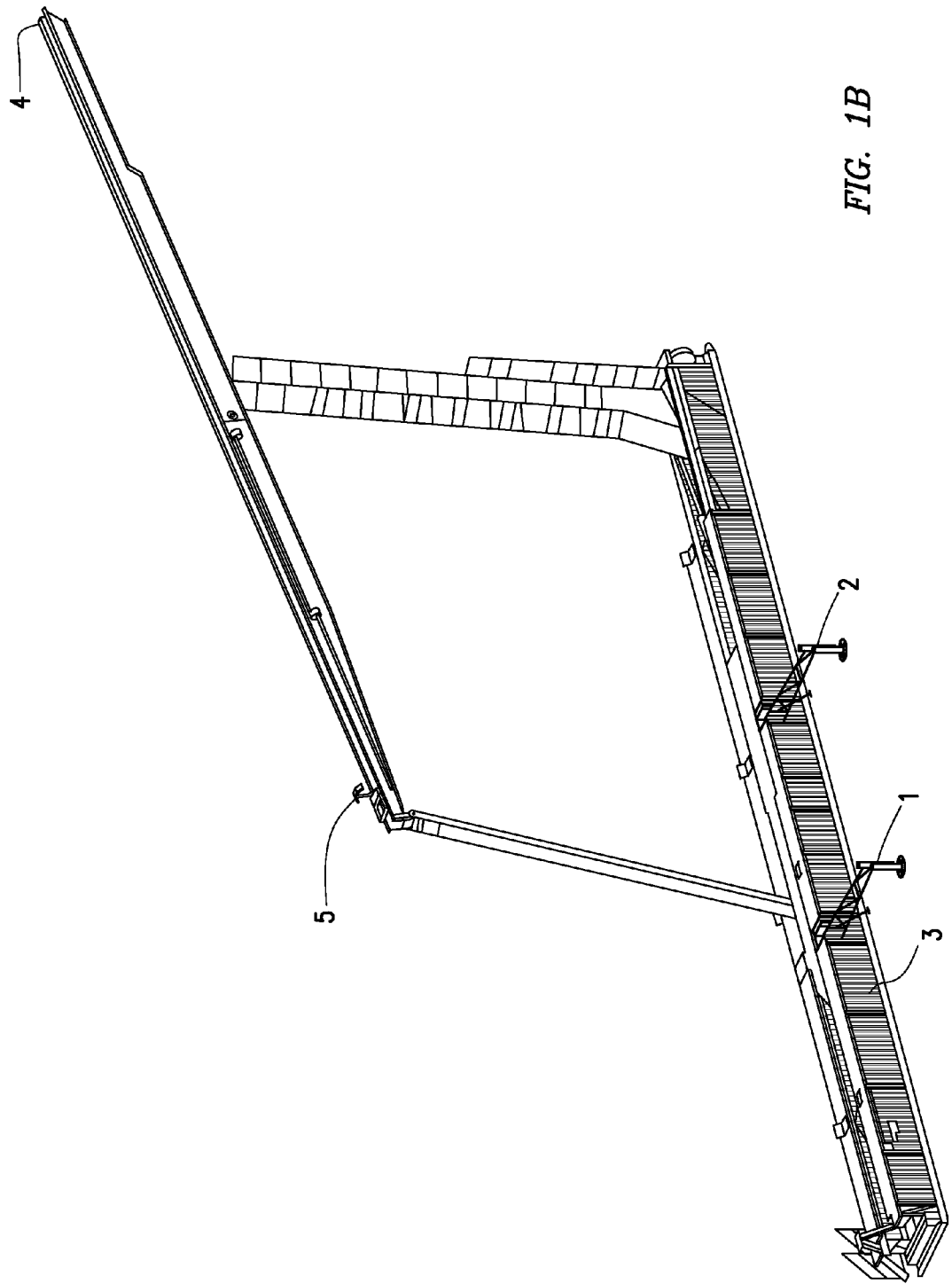
FIG. 1B shows the catwalk in an elevated position in which pipe is being conveyed to or from the drill floor.

FIG. 1A shows gullwings 1 and 2 attached to catwalk 3. Sections of pipe are positioned on gullwings 1 and 2. Gullwings 1 and 2 are raised temporarily using hydraulics to allow a section of pipe to roll onto catwalk 3 and into trough 4. The pipe is then conveyed to the drill center on a higher level drill floor using skate 5 as the catwalk 3 is raised to a position shown in FIG. 1B.

Figure 2:
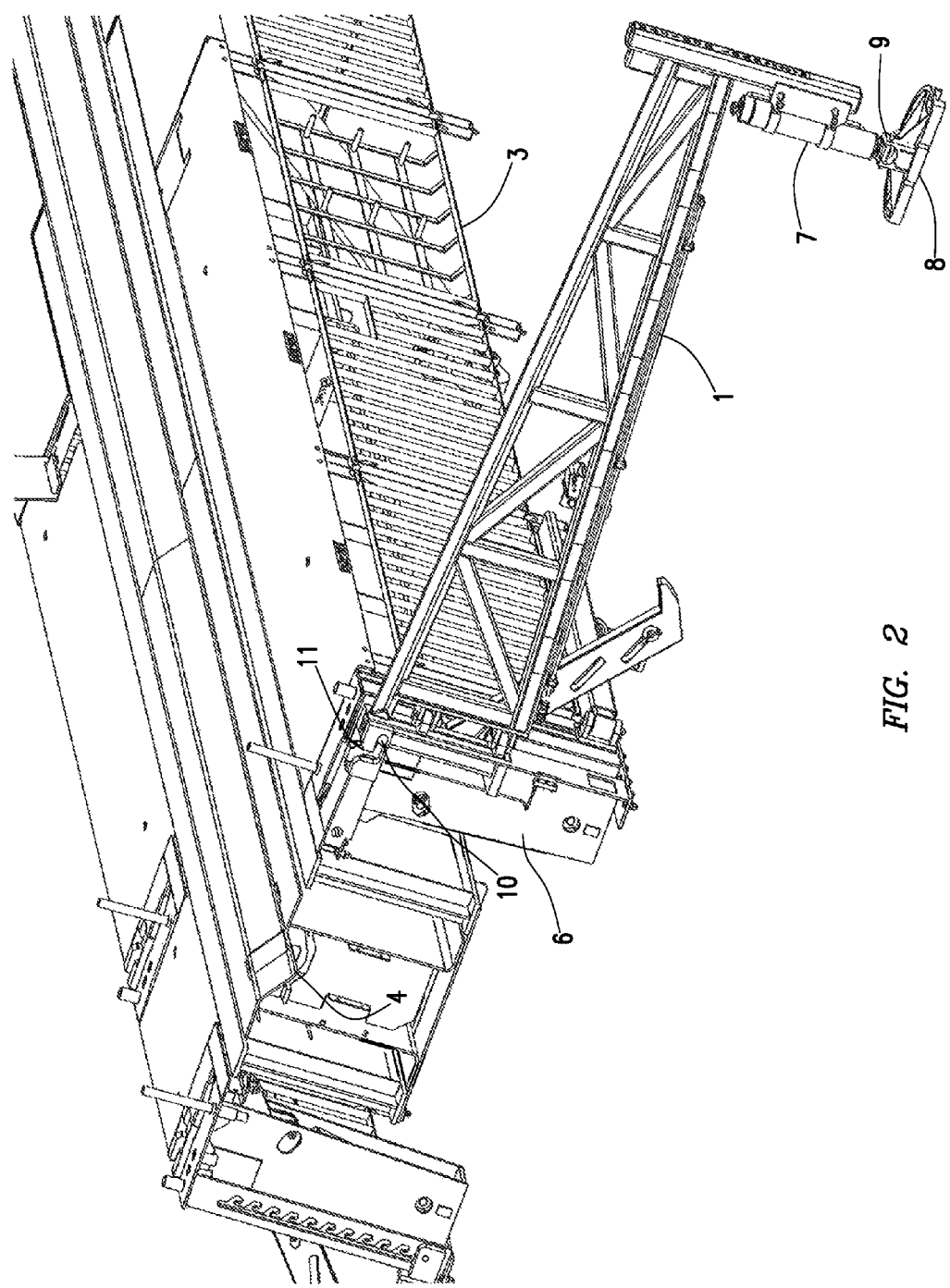
FIG. 2 shows a cross section of a catwalk where a gullwing is connected to an indexer module for the catwalk and, at the opposite end of the gullwing, a hydraulic cylinder that pushes against a pad to lower one side of the gullwing.

FIG. 2 shows a cross section of catwalk 3 and trough 4 where gullwing 1 is connected to catwalk 3 via indexer unit 6. The connection of gullwing 2 to catwalk 3 is identical. Hydraulic cylinder 7 is positioned on gullwing foot pad 8. Hydraulic cylinder 7 raises and lowers gullwing 1 by extending rod 9 against foot pad 8 as known in prior art systems. Gullwing pin 10, which is positioned in slot 11 in indexer unit 6, slides back and forth in slot 11 as gullwing 1 is raised and lowered by hydraulic cylinder 7, allowing gullwing foot pad 8 to remain relatively still.

Figure 3:
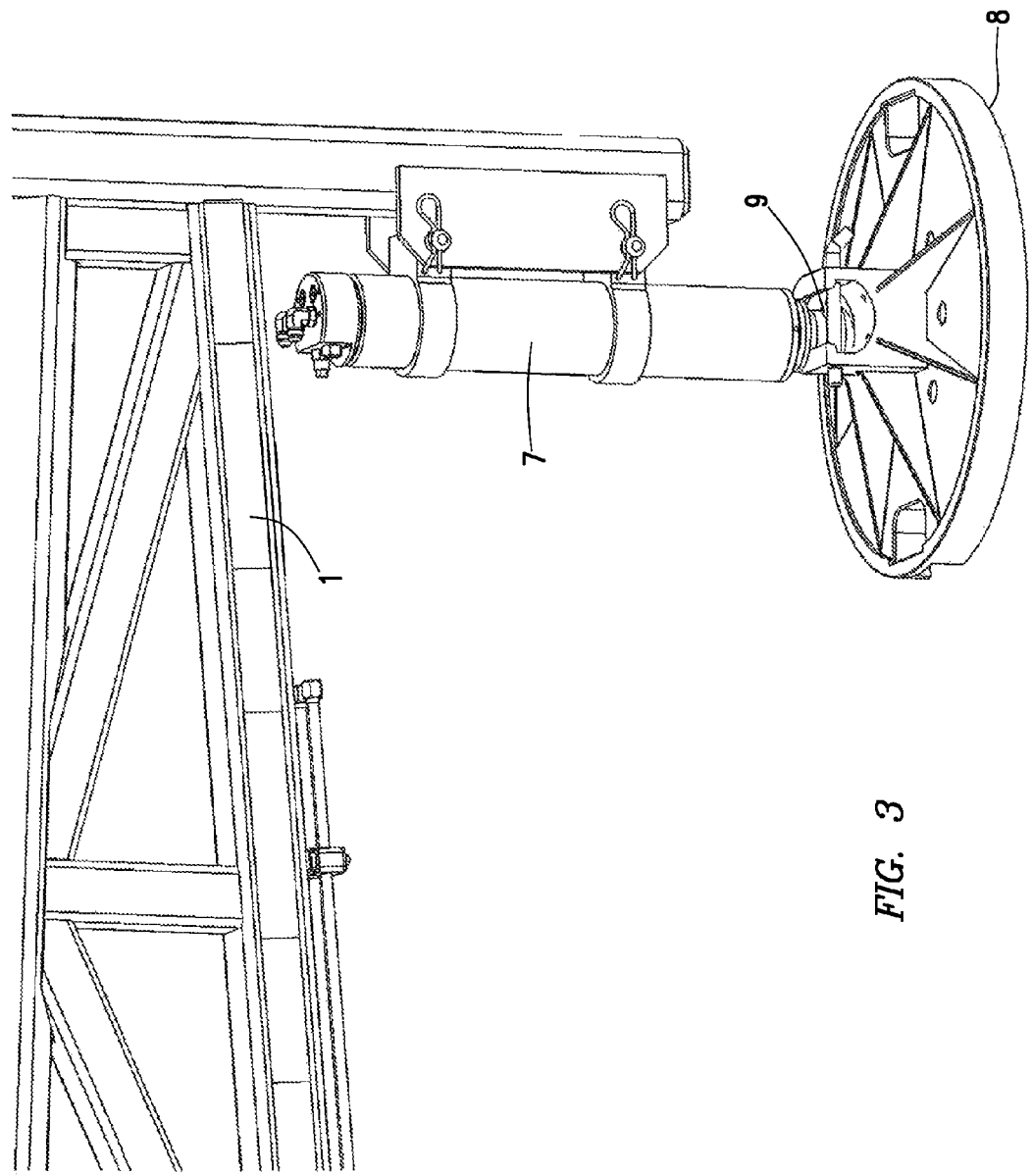
FIG. 3 shows the hydraulic cylinder and pad illustrated in FIG. 2.

FIG. 3 is a detailed view of hydraulic cylinder 7 attached to gullwing 1. Hydraulic cylinder 7 raises gullwing 1 by extending rod 9 against foot pad 8.

Figure 4:
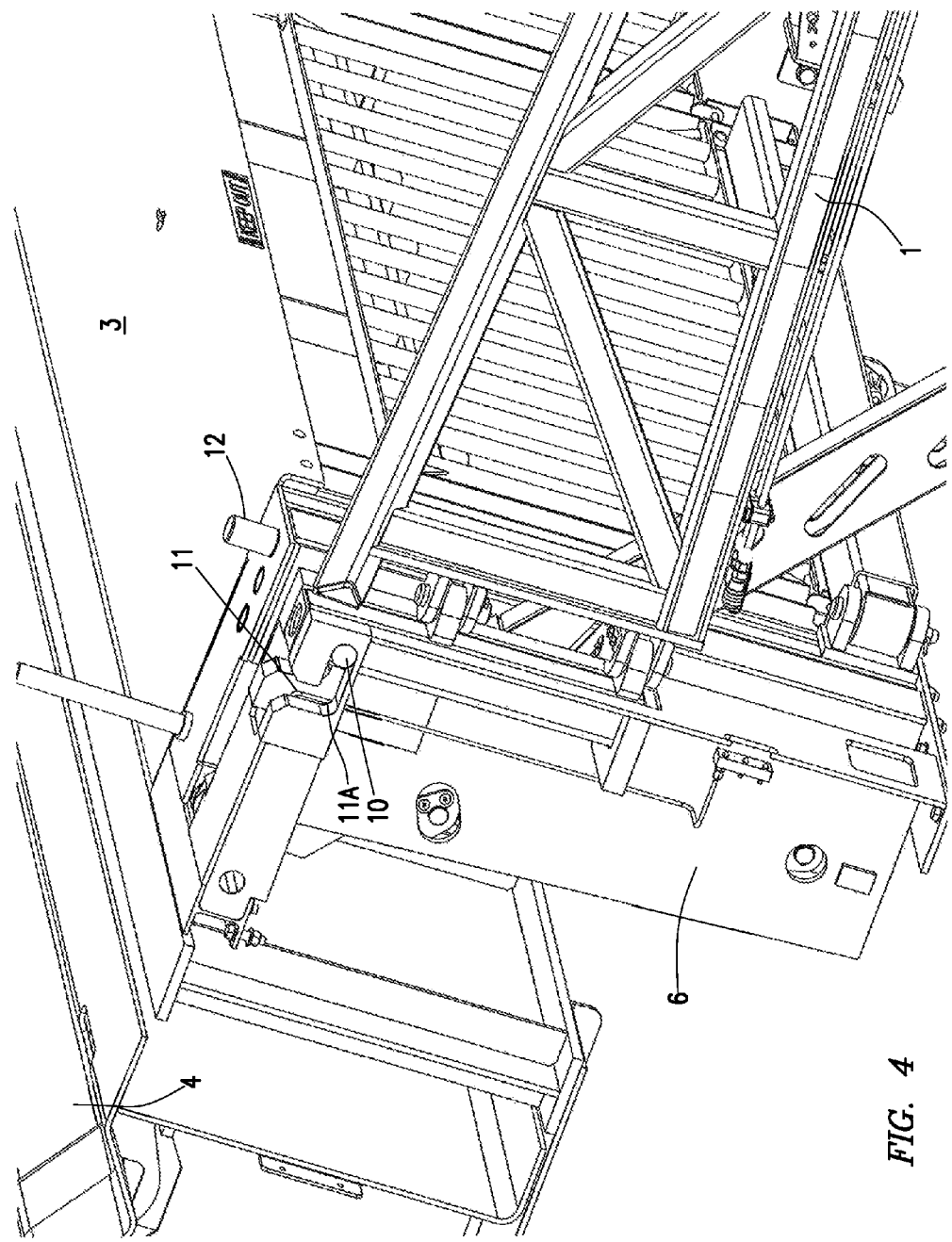
FIG. 4 is a closer view of the end of the gullwing connected to the catwalk.

FIG. 4 is a detailed view of gullwing 1 and gullwing pin 10 in slot 11. Pin 10 is shown in a position when pipe is not being moved toward trough 4. When gullwing 1 is raised, pin 10 moves toward point 11A in slot 11 (e.g. in a lateral, substantially horizontal direction toward the catwalk 3). The gullwing 1 may support multiple sections of pipe when raised. At least one section of pipe rests against indexer pin 12. Another indexer pushes the section of pipe over indexer pin 12, and that section of pipe rolls toward trough 4. When the indexer is retracted, the next section of pipe comes to rest against indexer pin 12. After all of the pipe sections have has passed indexer pin 12, gullwing 1 is lowered and pin 10 returns to its position shown in FIG. 4.

Figure 5:
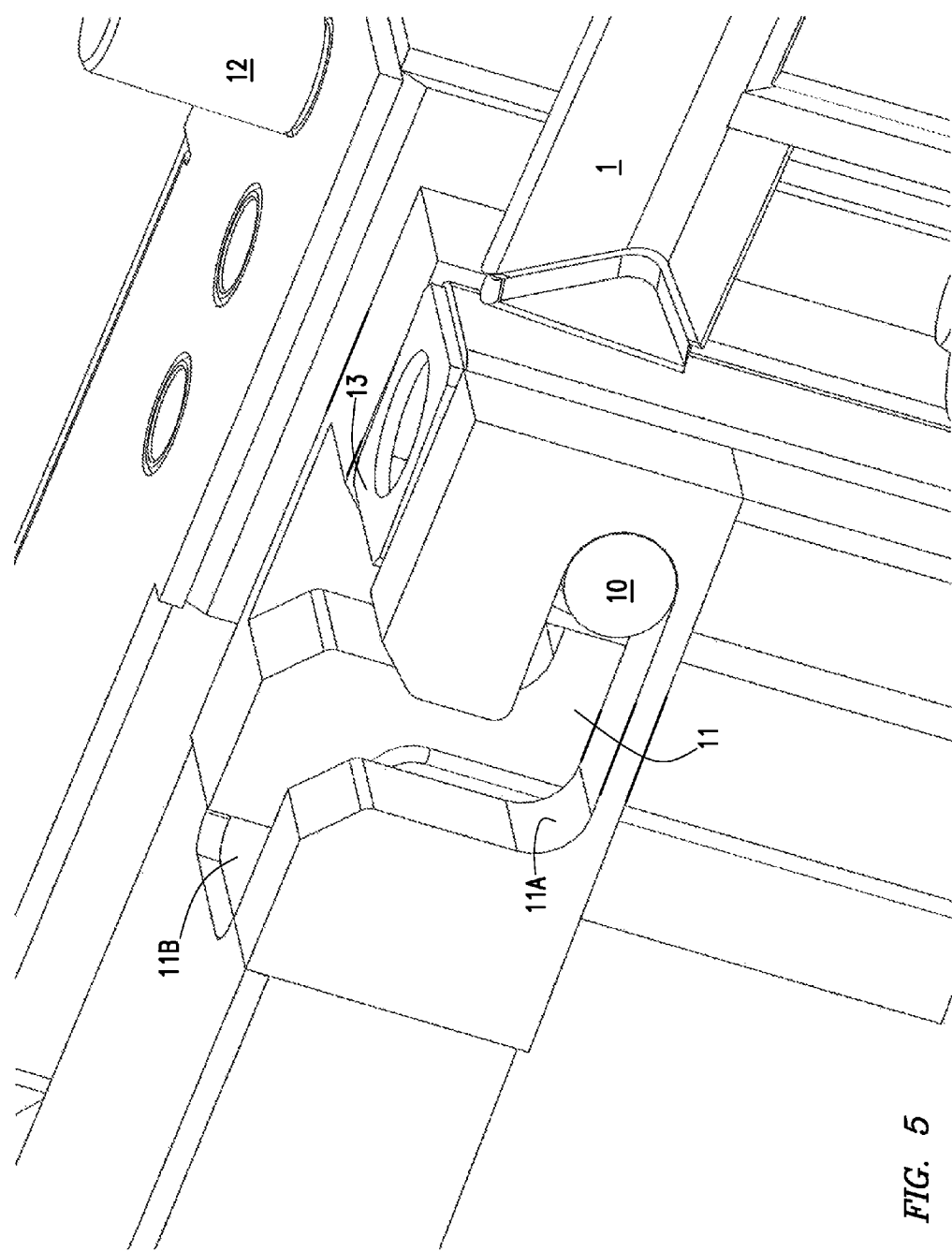
FIG. 5 is a cut-away view of a gullwing pin in a pin slot in the catwalk.

FIG. 5 is a detailed view of pin 10 in slot 11. Pin 10 moves toward point 11A in slot 11 when gullwing 1 is raised. Gullwing knuckle 13 similarly moves toward section 11B of slot 11 when gullwing 1 is raised. As a result of the movement of pin 10 and knuckle 13, foot pad 8 shown in FIGS. 2 and 3 stays relatively stationary.

Figure 6:
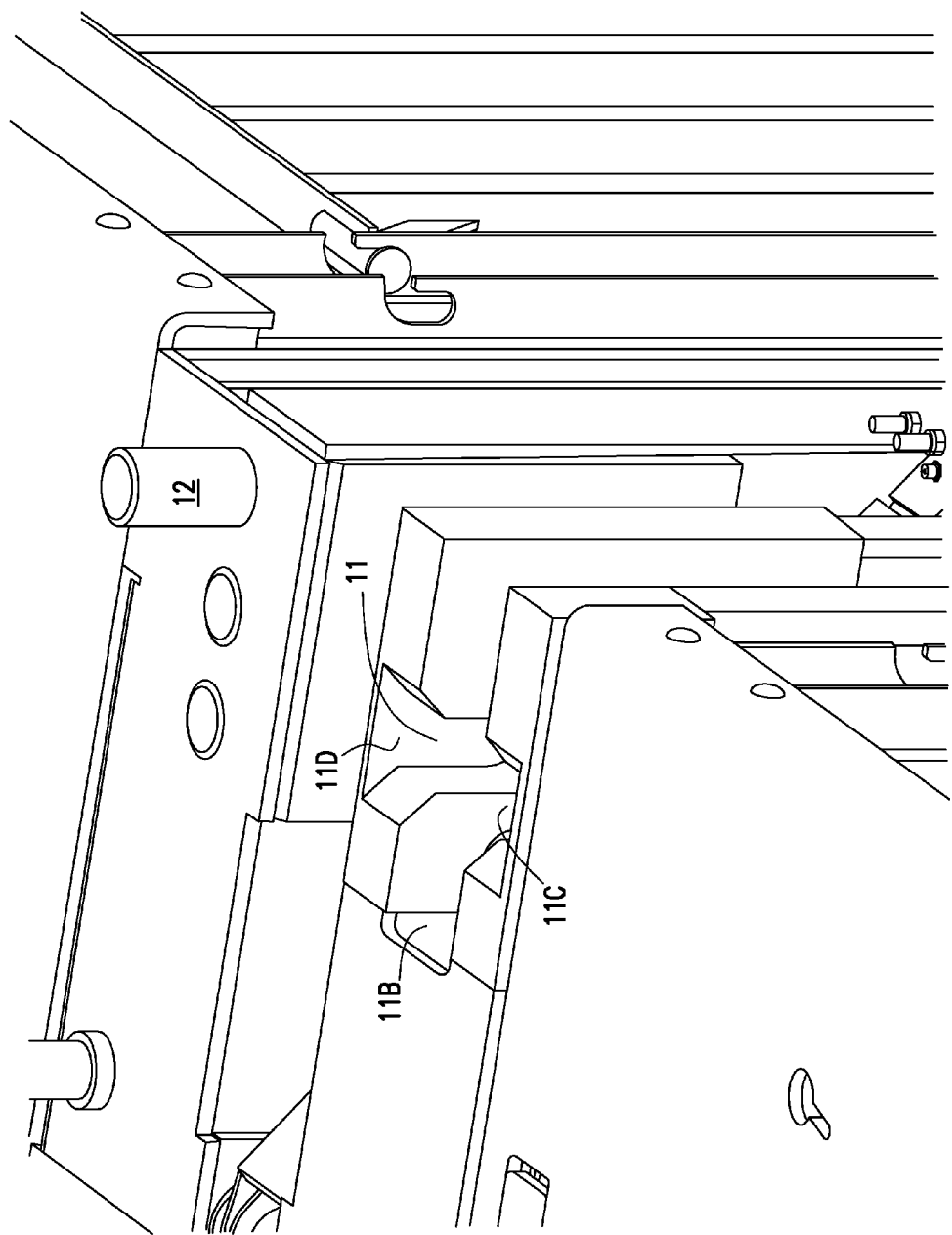
FIG. 6 is a top view of the pin slot.

FIG. 6 is a top view of slot 11. Areas 11C and 11D are the portions of slot 11 in which the pin 10 on the opposite side of knuckle 13 are inserted. Section 11B is space for knuckle 13 to move into when gullwing 1 is raised and pin 10 moves within slot 11.

Figure 7:
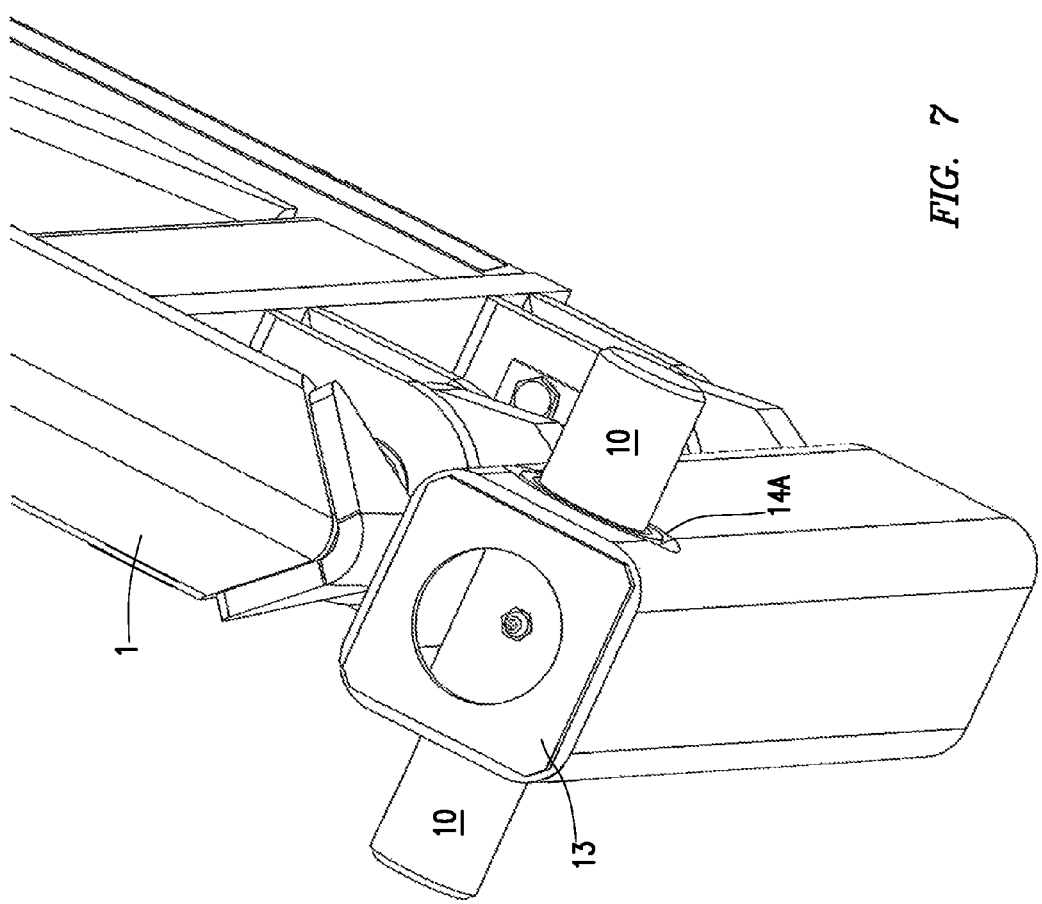
FIG. 7 is a view of the gullwing pin position adjacent to a top knuckle of the gullwing.

FIG. 7 is a top view of gullwing pin 10 positioned in gullwing 1 below gullwing knuckle 13. Bushing 14A is positioned in a hole below gullwing knuckle 13 and along with another bushing in a hole on the opposite side of the gullwing allows pin 10 to rotate within the holes as the gullwing 1 is moved up and down. This allows the pin 10 and knuckle 13 to move back and forth in slot 11 as described in reference to FIGS. 4, 5, and 6.

While the foregoing is directed to embodiments of the invention, other and further embodiments of the invention may be devised without departing from the basic scope thereof, and the scope thereof is determined by the claims that follow.

The invention claimed is:

1. A method of attaching a gullwing to a catwalk, comprising:
   coupling a pin to a knuckle of the gullwing; and
   inserting the pin into a slot formed in an indexer unit that is coupled to the catwalk to attach the gullwing to the catwalk, wherein the pin moves within the slot in a direction toward the catwalk when the gullwing is raised relative to the catwalk.

2. The method of claim 1, wherein the pin moves in a substantially horizontal direction within the slot toward the catwalk when the gullwing is raised relative to the catwalk.

3. The method of claim 1, wherein the knuckle is movable relative to the indexer unit when the pin moves within the slot formed in the indexer unit.

4. The method of claim 3, wherein the pin is disposed through the knuckle such that portions of the pin extend from opposite sides of the knuckle, and wherein the portions of the pin are positioned within the slot formed in the indexer unit.

5. The method of claim 1, wherein a foot pad coupled to the gullwing remains substantially stationary relative to the catwalk when the gullwing is raised or lowered.

6. The method of claim 5, further comprising raising the gullwing relative to the catwalk by extending a rod from a hydraulic cylinder against the foot pad.

7. The method of claim 6, further comprising supporting a section of pipe using an indexer pin of the indexer unit, wherein the section of pipe is transferred by the gullwing when the gullwing is raised relative to the catwalk.

* * * * *